US005491698A

United States Patent [19]
Patel et al.

[11] Patent Number: 5,491,698
[45] Date of Patent: Feb. 13, 1996

[54] SETTING OPTIMAL BOUNDARY THRESHOLDS IN A DECODER FOR CODED SIGNAL PROCESSING CHANNELS

[75] Inventors: Arvind M. Patel; Robert A. Rutledge; Bum S. So, all of San Jose, Calif.

[73] Assignee: International Business Machines Corporation, Armonk, N.Y.

[21] Appl. No.: 169,817

[22] Filed: Dec. 16, 1993

[51] Int. Cl.⁶ .................................................. H03M 13/00
[52] U.S. Cl. ................................. 371/6; 371/43; 341/59; 360/39
[58] Field of Search .................................. 371/6, 43, 44; 369/124; 360/39, 46; 341/155, 59

[56] References Cited

U.S. PATENT DOCUMENTS

| | | | |
|---|---|---|---|
| 4,418,406 | 11/1983 | Ogawa | 369/124 OR |
| 4,945,538 | 7/1991 | Patel | 371/43 |
| 5,282,216 | 1/1994 | Patel et al. | 371/43 |
| 5,291,500 | 3/1994 | Patel et al. | 371/43 |
| 5,298,901 | 3/1994 | Lekmine et al. | 341/155 OR |
| 5,313,472 | 5/1994 | Hara | 371/6 |
| 5,341,387 | 8/1994 | Nguyen | 371/43 |

OTHER PUBLICATIONS

Patel, A. M. "A New Digital Signal Processing Channel for Data Storage Products," *EEE Transactions On Magnetics*, Nov. 1991, vol. 27, No. 6, pp. 4579–4584.

*Primary Examiner*—Ellis B. Ramirez
*Assistant Examiner*—Kamini Shah
*Attorney, Agent, or Firm*—Henry E. Otto, Jr.

[57] ABSTRACT

To improve data detection reliability in a coded maximum likelihood signal processing channel, two counters count the number of times actual values of linear functions of digital sample values corresponding to one and another preselected data patterns are within m units above and m units below, respectively, a preselected decision boundary used to determine whether detected data corresponding to a coded sequence of runlength limited code is a "1" or a "0". A difference count has a magnitude and sign denoting difference between counts in the two counters. After N occurrences of each preselected data pattern irrespective of how far from the boundary, the boundary is adjusted upwardly or downwardly, provided the difference count at least equals +S or at most –S, respectively.

32 Claims, 7 Drawing Sheets

SETTING OPTIMAL BOUNDARY THRESHOLDS IN A DECODER FOR CODED SIGNAL PROCESSING CHANNELS

FIELD OF THE INVENTION

This invention relates to apparatus and methods For improving data detection reliability in a coded signal processing channel by determining and setting optimal values For threshold constants constituting decision boundaries for interpreting sample values representative of coded binary data.

BACKGROUND OF THE INVENTION

The following commonly-assigned prior art references are considered to be the most pertinent to the present invention:

1. U.S. Pat. No. 4,945,538, granted Jul. 31, 1990, entitled "Method and Apparatus For Processing Sample Values in a Coded Signal Processing Channel."
2. Allowed copending application U.S. Ser. No. 07/920,027, filed Jul. 27, 1992, now U.S. Pat. No. 5,282,216, granted Jan. 25, 1994, entitled "High Data Rate Decoding Method for Coded Signal Processing Channel."
3. Allowed copending application U.S. Ser. No. 07/526,878, filed May 22, 1990, now U.S. Pat. No. 5,291,500, granted Mar. 1, 1994, entitled "Eight-Sample. Look-Ahead For Coded Signal Processing Channels."
4. A. Patel, "A New Digital Signal Processing Channel For Data Storage Products," IEEE Trans. on Magnetics, Vol. 27, pp. 4579–4584, published November, 1991.

Each of the References 1–3 discloses a (1,7) ML decoder which uses a differing number of look-ahead digital sample values (y) derived from an analog read signal to execute several decisions for implementing a maximum likelihood (ML) decision. An ML decision involves comparing each of several linear functions (H) of the sample values (y) to the value of a threshold constant constituting a ML decision boundary related to that linear function. The linear functions and decision boundaries are chosen to minimize the overall mean square error in a ML sequence detection process using five, six, or eight look-ahead sample values of the read signal, as taught in References 1, 2, and 3, respectively.

Each Reference 1–3 discloses equations by which the decoder can compute nominal theoretical values of a set of boundary threshold constants from information about the shape of the analog pulse that is read back from the analog pulse transmitted over the (1,7) ML channel.

These references describe how to calculate and set at nominal theoretical values the test boundary threshold constants of look-ahead algorithms in order to accommodate variations in pulse shape when the pulse shapes are described in a simple form by six variables; i.e., when the read response to the positive and negative magnetic transitions are the pulses with the sample values . . . , 0, $\alpha_1$, $\beta_1$, $\gamma_1$, 0, . . . and . . . , 0, $-\alpha_2$, $-\beta_2$, $-\gamma_2$0, . . . , respectively. They also state that the thresholds may be optimized empirically in response to the boundary crossings in actual test data, but do not disclose how.

Moreover, the boundary threshold constants, as computed by these equations, are generated from the read back pulse corresponding to a single transition. This assumes that the positive or negative readback pulse has a single form which can be described by three non-zero sample values. However, these computed thresholds may not be optimal because in reality signal processing channels are subject to nonlinearity, misequalization, and pulse asymmetry, in addition to pattern-dependent noise.

Reference 4 describes a five-sample look-ahead algorithm, including a geometrical interpretation of the decision algorithm. Boundary constants are determined from formulae related to the pulse shape response for a single magnetic transition, as in References 1–3.

None of these references discloses or suggests (i) determining nominal values of the threshold constants from a statistically significant number of readback pulse transitions that account for nonlinearity, misequalization, pulse asymmetry and pattern-dependent noise, and (ii) treating as potential errors in the detected data those which are too close to a selected threshold boundary, and automatically adjusting each threshold boundary so that a substantially equal number of error events occur at each side thereof.

There is a need for apparatus and methods for (i) determining for each particular magnetic recording device optimal value settings for the decision-boundary-constituting threshold constants for a (1,7) ML channel despite signal and noise anomalies in the readback pulse, (ii) establishing the decision boundary from a series of magnetic recording transitions instead of by artificially superpositioning the pulse shape corresponding to a single magnetic recording transition, and (iii) setting these boundary threshold constants at their optimal values by use of a predetermined sequence of recorded data or by use of any data with or without comparison to known data subject to signal and noise anomalies.

SUMMARY OF THE INVENTION

A decoder and method are described for improving data detection reliability in a coded signal processing channel in which digital electrical signals representing digital sample values are generated from analog signals read by a transducer from digital data recorded on a data storage medium. A plurality of threshold constants whose values define decision boundaries are used in determining whether detected data corresponding to a coded sequence of a runlength limited (RLL) code is a "1" or a "0".

To determine an initial value for the threshold constant for a preselected decision boundary, two known preselected data patterns of the digital sample values are identified that are determined to be closest above and closest below, respectively, said boundary. Actual values of linear functions of the digital sample values corresponding to multiple occurrences of these two data patterns are preferably collected on a decision boundary plot to permit visualization of the decision process. Clusters are formed of actual values of the one data pattern above and the other data pattern below the decision boundary. A focal point is determined for each of the two clusters and the threshold constant for the preselected decision boundary is established substantially midway between such focal points, provided the actual values in both of said clusters exceeds a preselected sufficient number, and then loaded in a boundary register.

After the initial value of the threshold constant for the selected boundary has been determined, it is adjusted to an optimal value by either of two methods. In each method, separate counters count as potential error events in the detected data those which are determined to be both above and below a selected one of the decision boundaries as a result of a "1" being potentially misdetected as a "0" (corresponding to an N pattern being potentially misinterpreted as an M pattern), and vice versa. The selected decision boundary is adjusted in a direction toward providing a substantially equal number of potential error events at each side of that boundary. A multiplexor enables selection of the particular boundary to be evaluated and adjusted.

In one method, an error margin distance (MD) is computed which represents the difference between a boundary threshold constant and H' outputs representing actual values of the aforesaid linear functions. When this distance MD is small (within ±m units), it is considered a potential error event. This distance MD, when compared to zero, indicates whether the value of H' is above or below the decision boundary.

In the other method, while a sequence of digital sample values of the analog signals corresponding to known recorded data is generated, a selected one of the decision boundaries is intentionally moved upward m units and then downward m units from an initial preselected position to determine the number of potential error events on each side and to determine if and how the boundary should be adjusted.

DESCRIPTION OF PREFERRED EMBODIMENTS

Preliminary

Figure 1:
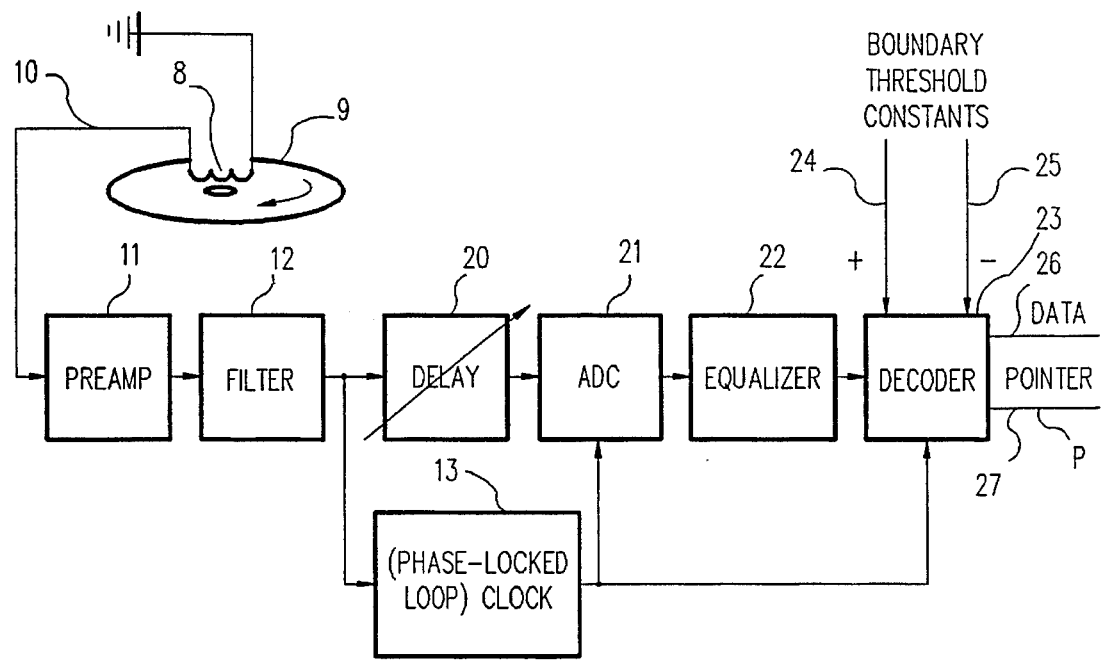
FIG. 1 is a schematic diagram of a coded digital signal processing channel, as known in the prior art.

FIG. 1 depicts, as known in the prior art, a coded digital signal processing channel, preferably an extended partial response maximum likelihood (EPRML) channel which is characterized by the polynomial $(1-D)(1+D)^2$. An analog signal is read by a transducer 8 from a magnetic recording medium, such as a disk 9, in a digital storage device. This read signal corresponds to a binary data sequence coded with the (1,7) run length limited (RLL) code during a write operation. The read signal passes from line 10 through a preamplifier 11 with automatic gain control (AGC) and a low bandpass filter 12. The output of filter 12 is supplied to a phase-locked clock 13 comprising a phase-locked loop timing recovery circuit including a variable frequency oscillator (VFO).

Filter 12 and equalizer 22 filter the read signal so that the response to a single magnetic transition is a pulse given by the sample values . . . , 0, 2, 4, 2, 0, . . . . This results in written transitions of magnitude 2 between +1 and −1 levels of magnetic saturation, and read response is normalized by a scaling factor to correspond thereto.

The coded analog read signal output from filter 12 is supplied to a delay means 20. Delay means 20 provides delay alignment between the analog signal and clock signal inputs to an analog-to-digital converter (ADC) 21. ADC 21 converts the analog input signal into digital sample values, such as $y_0 \ldots y_5$, at successive clock times, where $y_0$ corresponds to the current clock cycle. These digital sample values, optionally equalized by an equalizer 22, are then passed to a decoder 23. Positive and negative boundary threshold constants are applied via lines 24, 25, respectively, to decoder 23. Decoder 23 applies a decoding algorithm to the digital sample values to provide a coded binary data output in line 26 and, where appropriate, a pointer flag in line 27, at successive clock times under control of clock 13.

Figure 2:
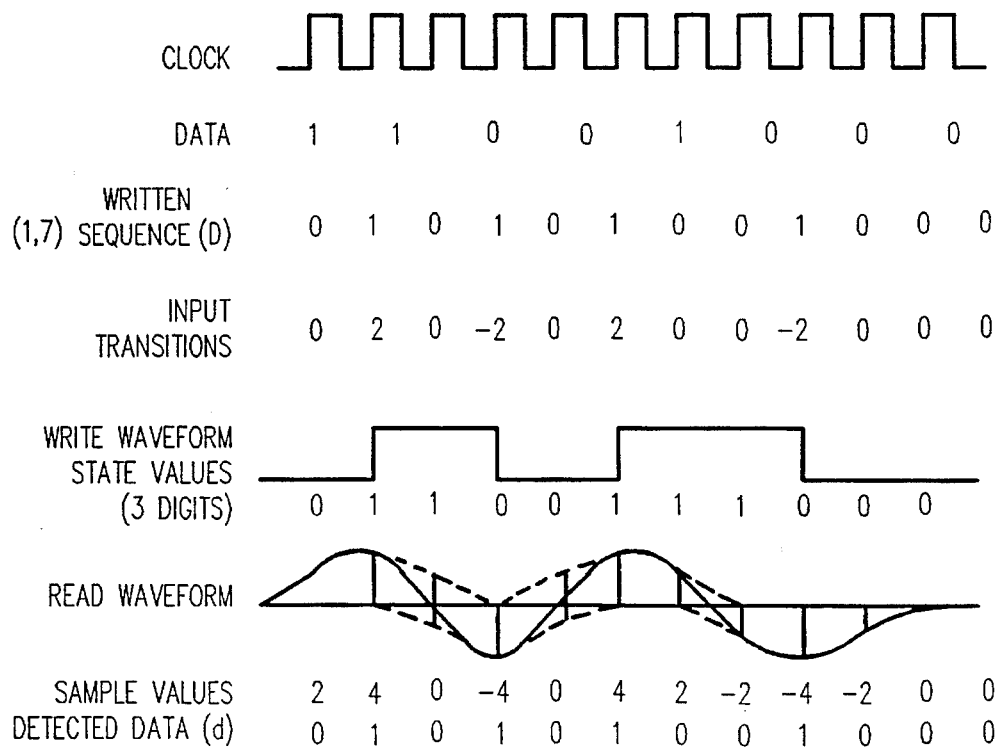
FIG. 2 depicts ideal write and read waveforms for (1,7) ML coded data and read sample values, as heretofore known.

FIG. 2 depicts the write and read waveforms and associated sequences of data and sample values clocked by clock 13 in a noise-free environment. As so depicted, the sample values range through the discrete set {−4, −2, 0, +2, +4}. Actual samples, however, as noted earlier, will not be exactly equal to the ideal patterns of the read signal because of signal anomalies due to nonlinearity, misequalization, and/or pulse asymmetry, as well as additive noise, and thus will range through various noninteger values around the integers in the discrete set. In general, $\vec{y} = \vec{x} + \vec{e}$ where $\vec{x}$ is exactly equal to one of the ideal patterns, and $\vec{e}$ is the error in the received signal. The (1,7) ML decoding algorithm decides which of the ideal patterns is closest to the actual received pattern.

At any point in time, the (1,7) ML channel will be in one of six states: 000, 100, 111, 011, 001, or 110. States 100, 000, and 001 correspond to detection of a positive read pulse and have mirror image (i.e., +/− sign) symmetry with states 011, 111, and 110, respectively, that correspond to detection of a negative read pulse. The current state is determined by past decoding decisions, and the current decoding decision determines which state comes next. Two of these states (001 and 110) are transitional only as the decision is automatic because the (1,7) code constraint implies that state 001 must be followed by state 011 and similarly state 110 must be followed by state 100. At each of the remaining four states, based on the sampled read signal, the channel must make a ML decision regarding the next state.

As in Reference 2, each decision of the (1,7) ML algorithm requires six linear functions, $H_1, H_2, H_3, H_4, H_5, H_6$, of the sample values $y_0, y_1, y_2, y_3, y_4, y_5$ to be computed and compared to six thresholds A, B, X, Y, Z and W as established by the boundary threshold constants. The A and B boundaries are for a baseline check, and the X, Y, Z and W boundaries are for a peak position check, as shown in Table 1.

Note that $H_3$ is compared to two different boundary thresholds X and Y. There are four sets (corresponding to four decision-making states), each consisting of six boundary thresholds, resulting in a total of 24 boundary threshold constants. The set used for each ML decision depends on the current state. An error is associated with the value of at least one of the functions $H_i$ falling on the wrong side of its boundary threshold.

It will thus be apparent that the probability of decoding errors is controlled by the established values of the boundary threshold constants.

Assume now, for sake of illustration, that the current state is 000. Decoding will be based on the next six values of the sampled read signal: $\vec{y}=(y_0,y_1,y_2,y_3,y_4,y_5)$. The 24 possible six-sample patterns of possible sequences for the ideal read signal corresponding to 24 possible binary data patterns for state 000 are set forth in Table 2.

Figure 3:
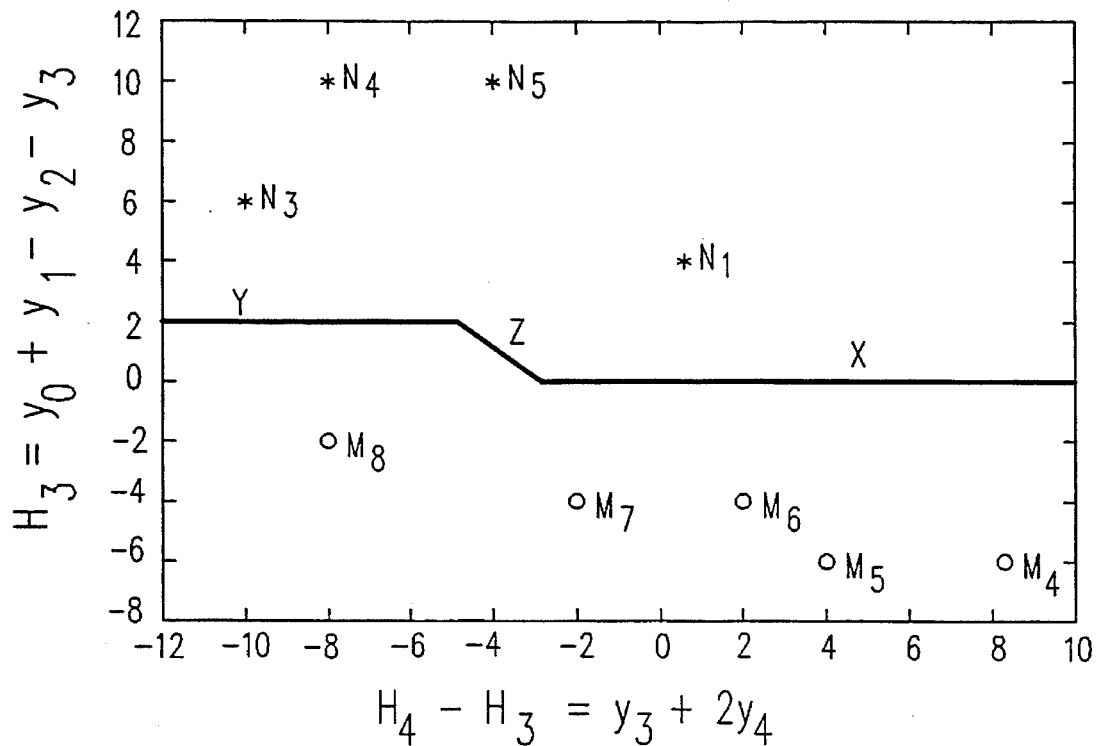
FIG. 3 is a boundary plot diagram for one type of peak position check for state 000, as known in the prior art.
Figure 4:
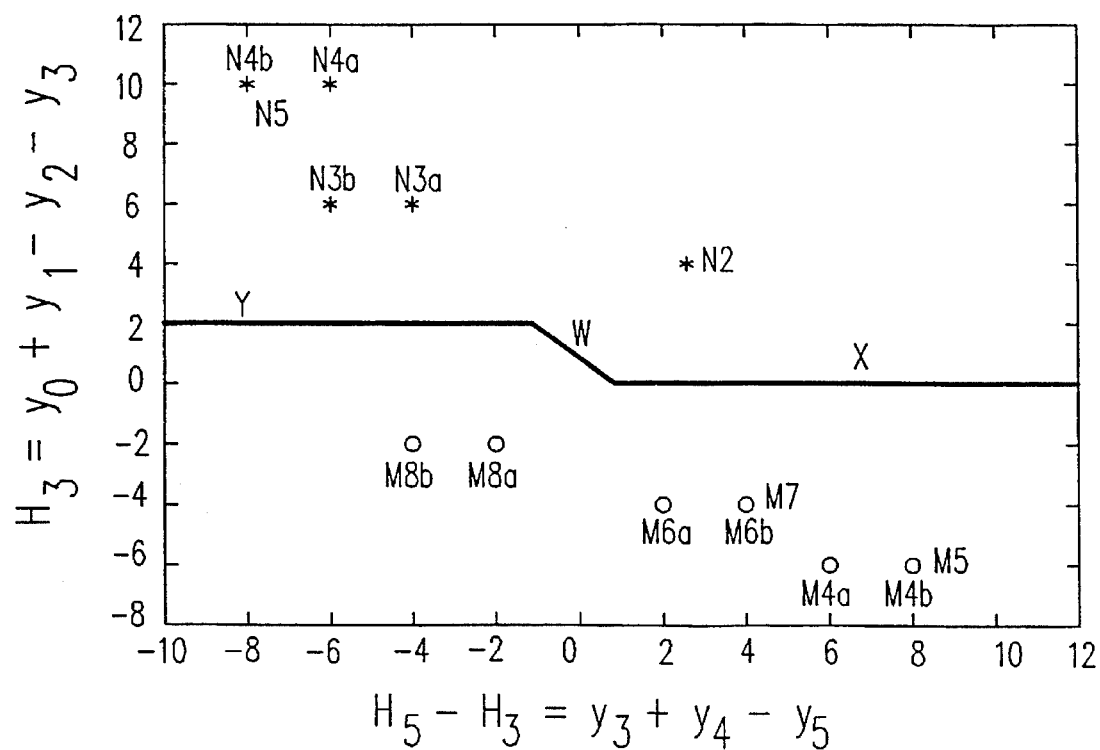
FIG. 4 is a boundary plot diagram for a modified peak position check for state 000, as known in the prior art.
Figure 5:
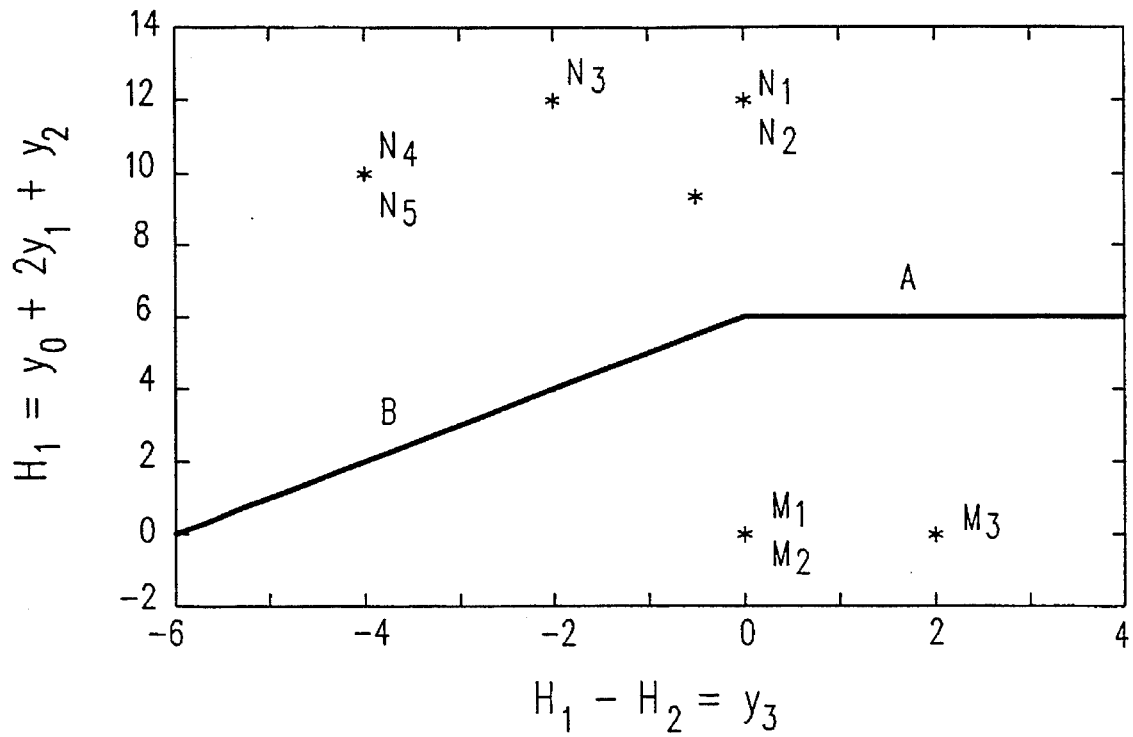
FIG. 5 is a boundary plot diagram for a baseline check for state 000, as known in the prior art.

The decision process can be represented geometrically by the graphs shown in FIGS. 3, 4, and 5. Each graph contains a line defining a boundary line between N patterns above the line and M patterns below the line. The points, as plotted in FIGS. 3, 4 and 5, correspond to the ideal patterns. The location of each boundary line segment is determined by a corresponding boundary threshold constant. For example, the Y boundary, as shown in FIGS. 3 and 4, is a segment of the line $H_3(\vec{y})=KY$, where KY is the threshold value. The functions $H_i(\vec{y})$ are computed and plotted on the appropriate graphs. If a point falls on the wrong side of the boundary, an error occurs. Thus, if the point corresponding to $\vec{y}$ is closest to one of the N patterns, then $y_0$ is decoded as a 2, and the next state is 001. If it is closest to one of the M patterns, then $y_0$ is decoded as a 0, and the next state is 000.

Figure 6A:
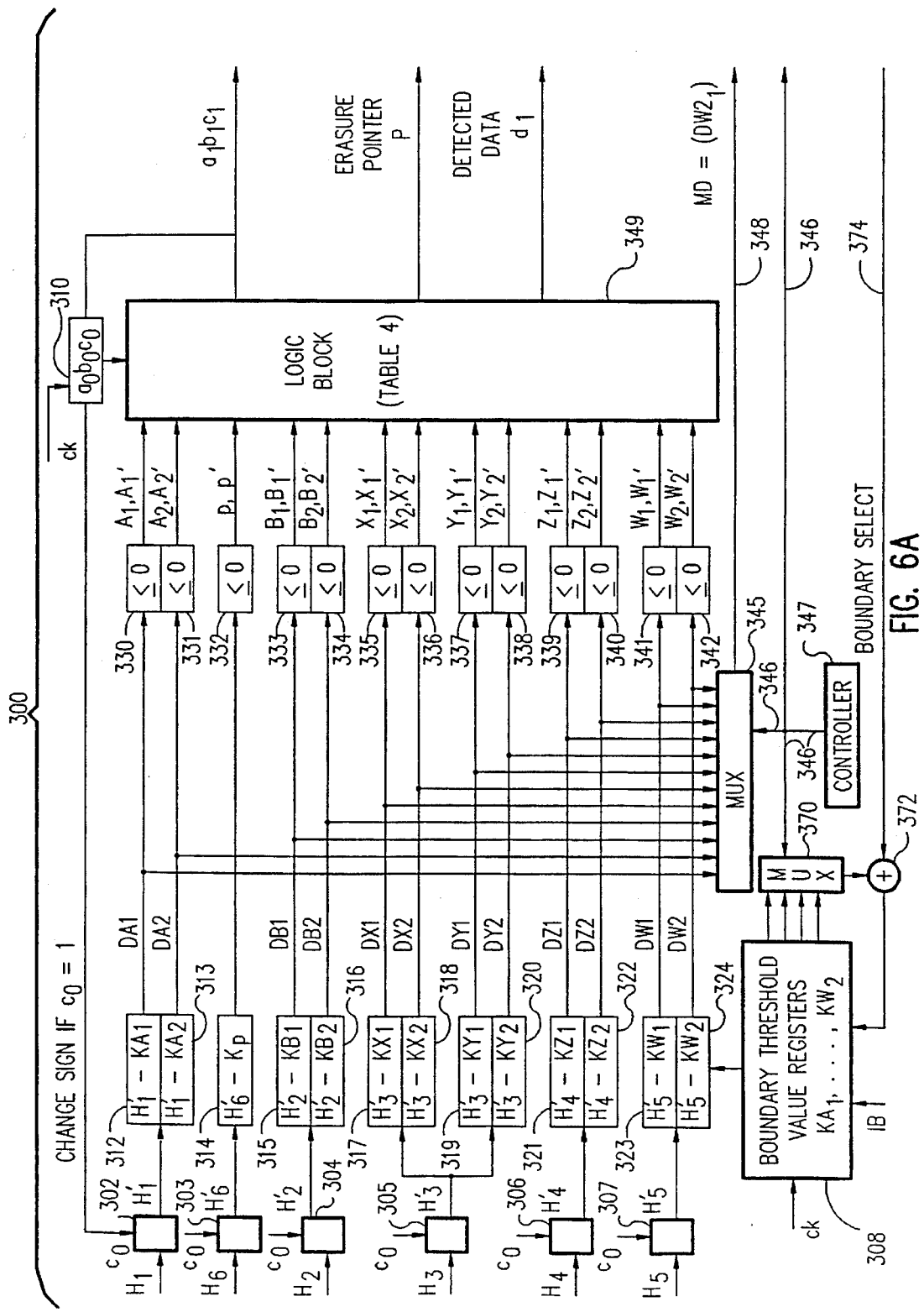
FIGS. 6A and 6B, when taken together, constitute a schematic diagram of a decoder apparatus embodying the invention and comprising a six-sample look-ahead feature and means for setting decision boundaries at optimal values in the coded digital signal processing channel of FIG. 1.
Figure 6B:
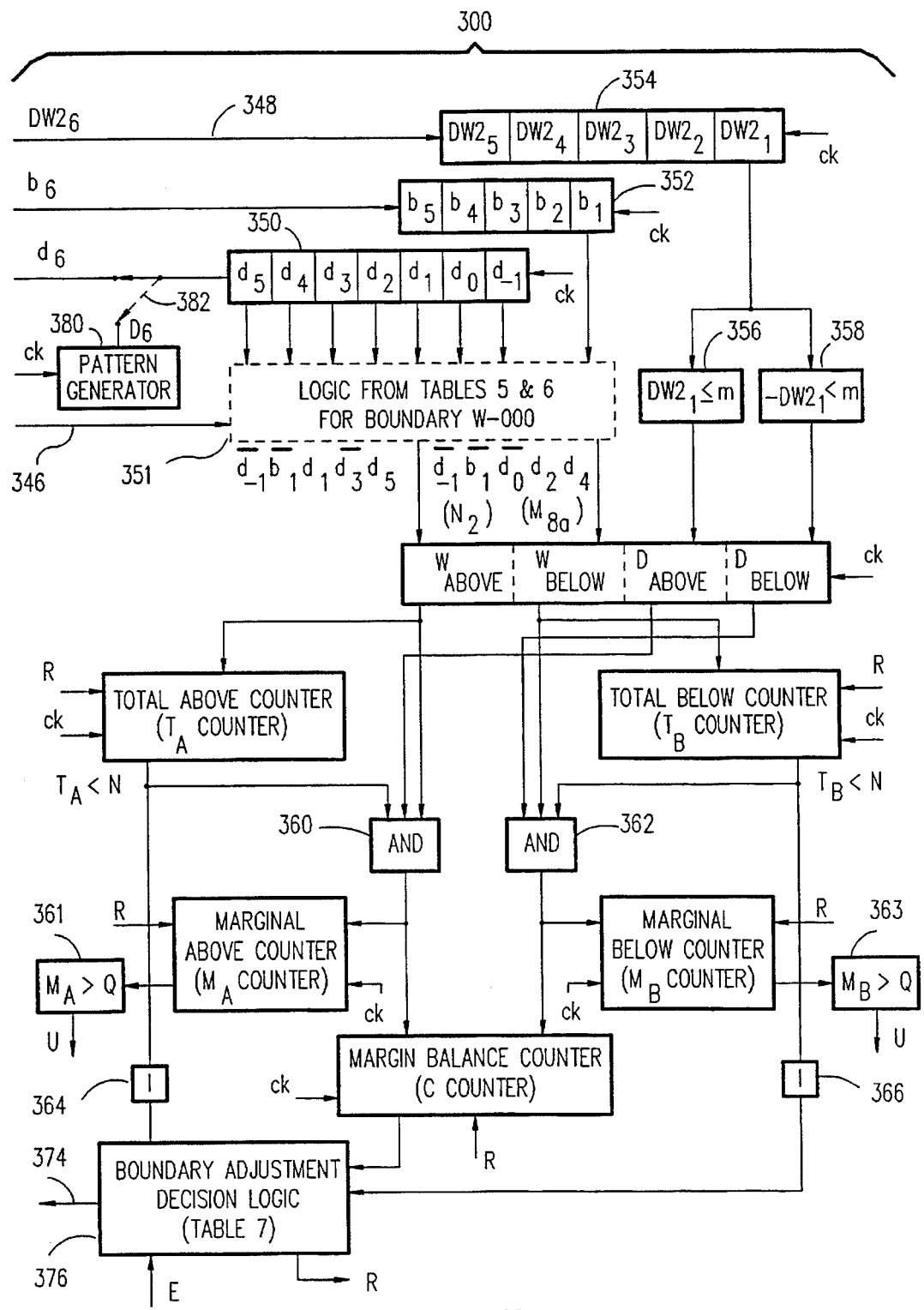

As illustrated in FIGS. 6A and 6B, the apparatus embodying the invention comprises a decoder 300 which replaces the prior art decoder 23 depicted in FIG. 1 and constitutes an improvement over the decoders disclosed in Reference 2. The following description has been limited to that considered necessary for an understanding of the embodiments of the present invention. For additional background description, the reader is referred to Reference 2.

In FIGS. 6A, 6B and 7A, 7B, ck will be used to designate the clock input from a common source that is required in order to provide the necessary timing for the various registers hereinafter described.

According to the invention, and in the manner hereinafter described, each of the 24 boundary threshold constants of the (1,7) ML decoder 300 is determined and separately and independently optimized to minimize the possibility of decoding errors. Two types of decoding errors can occur: (1) misdecoding an N pattern as an M pattern, which causes a "1" to be misdetected as a "0" in the detected (1,7) sequence; and (2) misdecoding an M pattern as an N pattern, which causes a "0" to be misdetected as a "1" in the detected (1,7) sequence. Adjusting the boundary threshold decreases the likelihood of one type of error but increases the likelihood of the other type of error.

Table 3 shows the six different types of boundary thresholds (A, B, X, Y, Z, W) that are to be optimized for the four different states (000, 100, 111, 011) for a total of 24 boundary types.

In the term $KW2^+$, W2 denotes a boundary that corresponds to the state 000 or 111; the superscript+ clarifies that the data pattern is generated by a positive read phase and therefore W2+ identifies the state as 000 rather than 111; and prefix K in $KW2^+$ denotes that the boundary has a preselected, but adjustable, constant value. Since each boundary threshold is optimized separately and independently, the methods and apparatus for optimizing the threshold value $KW2^+$ of only one boundary, the $W2^+$ boundary, will be described with the understanding that all other boundaries are optimized in a similar manner. Hereafter, the "+" superscript will be dropped for simplification; and this boundary will hereinafter be referred to simply as W2 and its threshold value as KW2.

Use of Focal Points of Data Pattern Clouds for
Initial Boundary Determination

This Section I describes how an initial value for a decision-boundary-constituting threshold constant for a (1,7) ML channel may be determined without requiring pulse sampling and calculation of a nominal value based upon the pulse shape of the read response to a single magnetic recording transition. It requires use of a known sequence of detected data.

Figure 8:
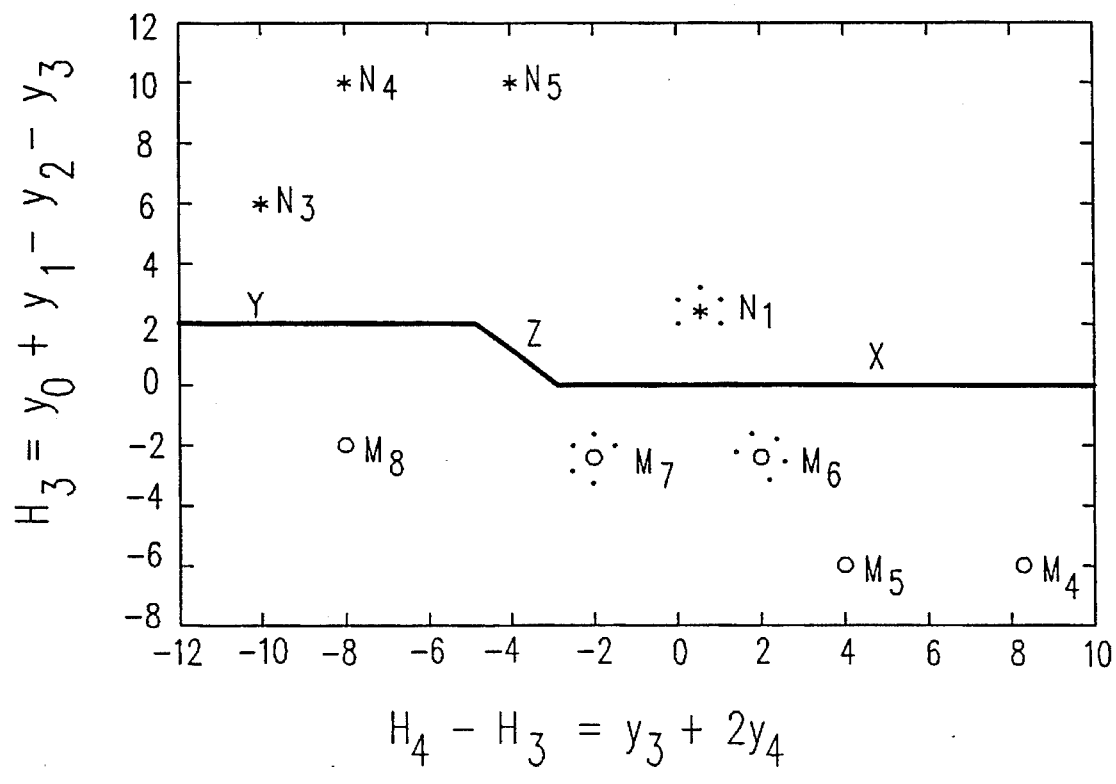
FIG. 8 depicts how the actual values for given data patterns ($N_1$ and $M_7$, $M_6$), due to noise, etc., fall at differing distances from an ideal (noise-free) position, and how the clusters of points generated by these actual values for each data pattern are resolved into a single "focal" point for establishing a decision boundary threshold constant.

In FIGS. 4 and 5, for simplification, each data pattern (eg., N2) has been shown as a single point based upon noise-free ideal signals. However, in actuality, due to noise, misequalization and other factors, a given data pattern will fall at differing distances from its ideal (noise-free) position as shown in FIG. 8 for data patterns $N_1$ and $M_7$. Thus the cluster of points generated by the actual values for a given data pattern will hereinafter be referred to as a "cloud." Each cluster of points or cloud is resolved into a respective single point hereinafter referred to as the "focal point." This focal point may, for example, be determined as the mean or average of the actual values of points in each cluster, or a selected subset of the actual values of points in each cluster, to implement this method in the manner now to be described.

According to the invention, the value of the threshold: constant for a selected decision boundary for each associated pair of patterns (eg., N2 and M8a) is determined from the focal points (such as the mean values) of the corresponding clouds using software. More specifically, a (1,7) sequence $\vec{D}=D_1, D_2, \ldots D_n$ (such as of 512 bits) corresponding to some pseudo-random data is written to a data storage disk; e.g., data shown below in Section II hereof in hexadecimal notation. The detected sequence $\vec{d}=d_1, d_2, \ldots d_n$ is obtained, as explained in connection with FIGS. 1 and 2, from digital sample values $\vec{y}=(y_1,y_2,\ldots y_n)$ generated from the analog read signal. The pseudo-random sequence should be preceded and followed by a one byte pad of zeroes, which are not decoded.

Now, using $\vec{d}$ and $\vec{y}$, the state vector $\vec{s}=(S_1, S_2, \ldots S_n)$ is computed, where $S_i$ is the state $a_ib_ic_i$ of the channel at the time that the $i^{th}$ sample is being decoded, assuming that prior decoding decisions were correct.

Next, the average value of each function $H_1-H_5$ in the left column of Table 1 is computed for each pattern or set of patterns in the columns on the right. For example, $\overline{H_1(N1_S,N2_S)}$ is equal to the average value of $H_1(\vec{y}_j)$ where $\vec{y}_j=(y_j,y_{j+1},y_{j+2},y_{j+3},y_{1+5})$, and the average is over all $\vec{y}_j$ for which $S_j=S$ (one of the four states 000, 011, 100, and 111) and the ideal pattern is $N1_S$ or $N2_S$. The occurrences of these values of $H_1(\vec{y}_j)$ are counted by suitable means (not shown) and, if desired, displayed on a screen to show the sample size for each cloud or set of clouds, to alert the user if there is an insufficient number of samples to determine any threshold.

Then, the thresholds are computed as the averages of the appropriate clouds, as follows:

$KA_S=[\overline{H_1(N1_S,N2_S)}+ \overline{H_1(M1_S,M2_S,M3_S)}]/2$.

$KB_S = [\overline{H_2(N4_S,N5_S)} + \overline{H_2(M1_S,M2_S)}]/2.$ $KX_S = [\overline{H_3(N1_S,N2_S)} + \overline{H_3(M6_S,M7_S)}]/2.$ $KY_S = [\overline{H_3(N3_S)} + \overline{H_3(M8_S)}]/2.$ $KZ_S = [\overline{H_4(N1_S)} + \overline{H_4(M8_S)}]/2.$ $KW_S = [\overline{H_5(N2_S)} + \overline{H_4(N8A_S)}]/2.$ An APL program listing to perform the calculations described above is at the end of the Description section. D17 is the binary vector of data which was written to the disk, and Y is the corresponding analog readback signal. $\underline{Y}$ and $\underline{D17}$ have above been referred to as $\vec{y}$ and $\vec{d}$, respectively. This program will compute all 24 thresholds and store the results in two APL vectors KPOS and KNEG, defined as follows:

KPOS=($A_{000}$, $B_{000}$, $X_{000}$, $Y_{000}$, $Z_{000}$, $W_{000}$, $A_{100}$, $B_{100}$, $X_{100}$, $Y_{100}$, $Z_{100}$, $W_{100}$)

KNEG=($A_{111}$, $B_{111}$, $X_{111}$, $Y_{111}$, $Z_{111}$ $A_{011}$, $B_{011}$, $X_{011}$, $Y_{011}$, $Z_{011}$, $W_{011}$)

The program contains one loop, in lines 12–46, which is executed once for each of the four states, 000, 100, 111, 011, with the variable T used to indicate the state for which thresholds are being computed.

Lines 11, 14 and 22–25 compute the variable E, which contains the locations, within D17, where the channel is in state T. Lines 16–20 compute the $H_i$ functions, as defined in Table 6, for every six-tuple $(y_j, y_{j+1}, y_{j+2}, y_{j+3}, y_{j+4}, y_{j+5})$, within the vector Y.

Lines 27–36 compute the locations, within D17, where the channel is in state T, and the next six data points form one of the patterns indicated in the comment on the right side of the line. In addition, the sample size for each pattern or set of patterns is collected in the variable S.

Lines 40–45 compute the thresholds for state T, using the equations given in Section I of Table 5. Each threshold constant preferably is initially determined by use of the focal point method just described; or, if desired, it may be calculated and set at a nominal theoretical value as taught in the prior art. The value or setting of the threshold constant is then optimized.

Two methods for adjusting the boundary thresholds and the decoder apparatus for implementing these methods will now be described. Each is based upon the unique relationship between the boundary settings and potential error events in the (1,7) ML channel. In each case, in accordance with the invention, the boundary threshold is set at a point where potential error events in each direction, upward and downward, are substantially balanced.

A. Use of Error Margin Measurement for Boundary Adjustment

Referring now to FIG. 6A, inputs $H_1$–$H_6$ represent precomputed linear functions of digital sample values $y_0$–$y_5$ corresponding to multiple occurrences of one proselected N data pattern and another proselected M data pattern. They preferably are generated in precisely the same manner as shown and described in connection with FIG. 4 of Reference 2. Hence, the manner in which they are generated will not here be shown or described. Note that input $H_6$ for computing the boundary P for the phase check is not relevant to the present invention.

As in Reference 2, six sign change blocks 302–307 change the sign of the incoming binary number $H_1$–$H_6$ whenever the $c_0$ bit in a state register 310 has the value "1", which corresponds to states 001 and 111 in the negative phase of the sampled read signal. The outputs $H'_1$–$H'_6$ from the respective sign change blocks 302–307 and also the initial boundary threshold constants $KA_1$... $KW_2$ (previously loaded via bus IB into boundary-threshold-value register 308) are fed in parallel to a set of subtractors. Subtractors 312–324 compute differences between an H' output and a related boundary threshold prefixed K to provide an output prefixed D representing an error margin distance MD. This distance MD is fed to a related one of the comparators 330–342 which, by comparing the MD to zero, determines whether the value of H' is above or below the threshold boundary.

For example, the output from subtractor 312, which is $DA1=H'_1-KA_1$, is fed to comparator 330; and comparator 330 compares this to zero to generate the Boolean value $A_1=(DA1>0)$, which denotes whether the function $H'_1$ is above or below the decision boundary. This result is the same as that achieved in the decoder shown in FIG. 4 of Reference 2; and hence the intermediate logic and output logic, as set forth herein in Table 4, is identical with that shown in the APL program listing of Reference 2. However, the present method has the advantage that the output from the subtractor 312 can be used as a measure of available margin to a potential error event, called margin distance MD.

The outputs from the comparators 330–342 are values "1" or "0", which, together with the state values $a_0$, $b_0$, $c_0$ from state register 310, are fed to the logic block 349 for implementing the logic shown in Table 4.

The logic of block 349 provides the detected data $d_0$ corresponding to state $a_0b_0c_0$ and the erasure pointer P in accordance with the logic of Section 1 of Table 4. Block 349 also creates the state values $a_1b_1c_1$ for the next state in accordance with the logic of Section 3 of Table 4 including the intermediate logic of Section 2 thereof. This state value is supplied to state register 310 to become the current state value $a_0b_0c_0$ for the next clock cycle.

The error margin distances MDs are available for all boundaries as outputs of the subtractors 312–324. Multiplexor (MUX) 345 responds to a boundary select signal in line 346 From a test controller 347 to select and output to line 348 one of the error margin distances $DA1_1$... $DW2_1$, to be examined for a boundary threshold of interest.

Assuming the error margin distance MD to be selected is DW2 (the difference output of subtractor 324), MUX 345 will output $DW2_1$ for the boundary W2 to line 348. The outputs $b_1, d_1, DW2_1$ of FIG. 6A are used to implement the boundary adjustment process. Note that FIG. 6B depicts the state of the system five clock cycles later, relative to FIG. 6A, and so these outputs are labeled $b_6, d_6$ and $DW2_6$, respectively, in FIG. 6B. The d and b outputs, which are binary, are fed into a seven-bit shift register 350 and a five-bit shift register 352, respectively. The DW2 values, which are numerical values, such as in bytes, are fed into a five-byte shift register 354.

The outputs from comparators 356 and 358, in combination with the logic of Tables 5 and 6, generate, at each clock cycle, four binary values, $D_{above}, D_{below}, W_{above}$ and $W_{below}$, which are stored in single-bit registers similarly designated. These binary values are used to increment a set of five counters, denoted $T_A, T_B, M_A, M_B$ and C, respectively. Initially each of these counters is set to zero by a signal in reset line R. Then they are updated at each cycle.

Comparators 356 and 358 compare the error margin distance value $DW2_1$ to a predetermined constant m to determine whether it is within m units above or below the boundary, respectively. The binary values $D_{above}$ and $D_{below}$ are computed as $$D_{above} = \begin{cases} 1 & \text{if } DW2_1 \leq m \\ 0 & \text{otherwise} \end{cases}$$

$$D_{below} = \begin{cases} 1 & \text{if } -DW2_1 < m \\ 0 & \text{otherwise} \end{cases}$$

It is also necessary to process the values of $d_{-1}$ and $b_1$ which are combined in block 351 in one logical expression to indicate if the system was in the desired state (here assumed as 000) while $d_1$ was being detected. At the same time, the values of $d_0 \ldots d_5$ are concurrently combined in block 351 into two different logical expressions which respectively indicate each occurrence of the one N data pattern (N2) nearest above and the one M data pattern (M8a) nearest below the W2 boundary irrespective of actual distance from said boundary.

The logical expressions to be used for each state and for the pattern boundaries are given in Tables 5 and 6, respectively, wherein $\phi$ indicates a "don't care". Note that the nearest patterns at each boundary are unique, except in the case of the B boundary (see FIG. 5) which has more than one equally near patterns N4, N5, and N3 above the boundary, corresponding to 0, 1, 0, 1, 0, $\phi$ and 0, 1, 0, 0, 1, 0, respectively.

$W_{above}$ will be a logical "1" whenever the selected data pattern (in this case, $N_2$) occurs at a given state fin this case, assumed 000) irrespective of how far above the W2 boundary. Similarly, $W_{below}$ will be a logical "1" whenever the selected data pattern (in this case, M8a) occurs at a given state (herein 000) irrespective of how far below the W2 boundary.

If $W_{above}=1$, $T_A$ counter will be incremented one unit. The $T_A$ counter counts up the total number of occurrences of that data pattern (herein N2) which is nearest above (irrespective of how far above) the W2 boundary, until a preselected number N of such patterns has occurred. If $W_{above}=1$ and also $D_{above}=1$, while the count in $T_A$ counter is less than N, the AND gate 360 will be enabled and cause the $M_A$ counter to be incremented. This counter accumulates the number of times that the corresponding computed decision function (in this case, $H'_5$) is above and very close to (i.e., within m units of) the W2 boundary until the count in the $T_A$ counter reaches N and thereby disables the AND gate 360.

Then the same method will be followed for that data pattern (in this case, M8a) which is nearest below (irrespective of how far below) the decision boundary (in this case, W2). The $T_B$ and $M_B$ counters will be incremented in a similar manner. If $W_{below}=1$, then the $T_B$ counter will be incremented one unit, up to the maximum value of N. This counter will count up the total number of occurrences of the data pattern which is nearest below the W2 boundary, until N actual values such patterns have occurred. If $W_{below}=1$ and also $D_{below}=1$, while the count in $T_B$ counter is less than N, the AND gate 362 will be enabled and cause the $M_B$ counter to be incremented. This counter accumulates the number of times that the actual values of the corresponding computed decision function ($H'_5$) is below and very close to (i.e., within m units of) the W2 boundary.

Meanwhile, the C counter which constitutes a margin balance counter, will be decremented if $W_{above}=1$ and $D_{above}=1$ while $T_A<N$, and incremented if $W_{below}=1$ and $D_{below}=1$ while $T_B<N$. Therefore it will accumulate the difference between the number of points below and above the W2 boundary, counting only those points within m units of the W2 boundary. If the current value KW2 of the threshold of the W2 boundary is lower than the optimal value, then the C counter will tend to increment, while if KW2 is above the optimal value, the C counter will tend to decrement.

If and when the count in both the $T_A$ and the $T_B$ counter reaches N, their outputs will drop causing inverters 364 and 366 to condition the circuitry 376 to examine the value in the C counter. The value in the C counter will determine whether to adjust the boundary threshold. It will be adjusted upward if the count is at least equal to a preselected number S, or downward if it is less than or equal to −S, or adjustment will stop if the count is between +S and −S, using the adjustment decision rule shown in Table 7. MUX 370 (FIG. 6A), meantime, will have been conditioned by the signal in line 346 to feed the current threshold value KW2 to adder 372. The other input to adder 372 from line 374 will be a "1", "0", or "−1" as determined by the boundary adjustment decision logic circuitry 376 (FIG. 6B) which implements the decisions specified in Table, 7. The value of boundary threshold constant KW2 in the appropriate boundary threshold value register 308 will be updated by the output of adder 372.

Meanwhile, if the count in either counter $M_A$ or $M_B$ exceeds a preselected number Q<N, then circuit 361 or 363, respectively, will provide an output U. This output indicates the device being tested is unacceptable because too many (more than Q) actual values fall within m units above or below the W2 boundary—a condition which can occur even if the difference count in counter C is acceptable and the counts in either $T_A$ or $T_B$ have not reached N.

If the boundary threshold value is changed, the $T_A$, $T_B$, $M_A$, $M_B$ and C counters will be reset to zero by a signal on line R, and the process will be repeated to determine whether further changes should be made to the threshold value KW2 of the W2 boundary. At some point, when the boundary threshold value has reached an optimal state, the C counter will tend to neither increase nor decrease very much, and the $T_A$ and $T_B$ counters will both reach N before the C counter reaches a preselected number S or −S, where S< N. At this point, the boundary will be deemed optimal, and the adjustment process will stop.

This approach seeks to balance the respective error margins for data patterns above and below each boundary. For this process to work, the data sequence being read must contain the relevant data patterns in sufficient frequency that the $T_A$ and $T_B$ counters will both reach N in a reasonable time. For this example, at state 000 indicated by $d_{-1}b_1=00$, the patterns N2 and M8 given by $d_0d_1d_2d_3d_4d_5=010001$ and $d_0d_1d_2d_3d_4d_5=001010$ must both occur frequently in the data pattern.

Instead of using the inputs $d_{-1} \ldots d_6$, representing the detected data, for identifying the states and the patterns as set forth in Tables 6 and 7, the inputs $d_{-1} \ldots d_6$ may be replaced by a stream of known data $D_{-1} \ldots D_6$ that corresponds to this detected data. While this has the advantage that the inputs will be known to be correct, it requires that a known pattern be used in the boundary-adjustment process. It requires additional hardware, such as a pseudo-random pattern generator 380, to be switched by switch 382, to provide this data stream during the read operation for boundary adjustment. The following 32-byte pattern (in hexadecimal notation) is an example of a short pattern which, if written repeatedly along a data track, provides sufficient frequency of patterns for adjusting each of the 24 boundary values.

| 4515 | 1455 | 528A | 2492 | 0841 | 08A2 | 8411 | 2494 |
| 40AA | A821 | 2882 | 0820 | 4545 | 4A24 | 8422 | 8449 |

The boundary adjustment process is initiated by an enable or power-on signal in line E. This signal can be generated at a selected time during final test of a disk drive. Alternatively, it may be generated dynamically while the disk drive is in use by a customer during a read operation or during a time out between consecutive read operations.

When boundary adjustment has been completed, the contents of the counters can be used to determine the error margin of the device under test. The quantities $M_A/N$ and $M_B/N$ give estimates of the probability of points falling within m units of the boundary, on either side. For a good device, $M_A/N$ and $M_B/N$ will both be small. If either $M_A/N$ or $M_B/N$ is larger than some predetermined probability P, where P= Q/N, then the error margin for that device will be considered too small, and the device should be rejected or repaired. This technique can be used at the time of manufacture or by a customer during actual operation.

B. Use of Error Mode Analysis for Boundary Adjustment

Figure 7A:
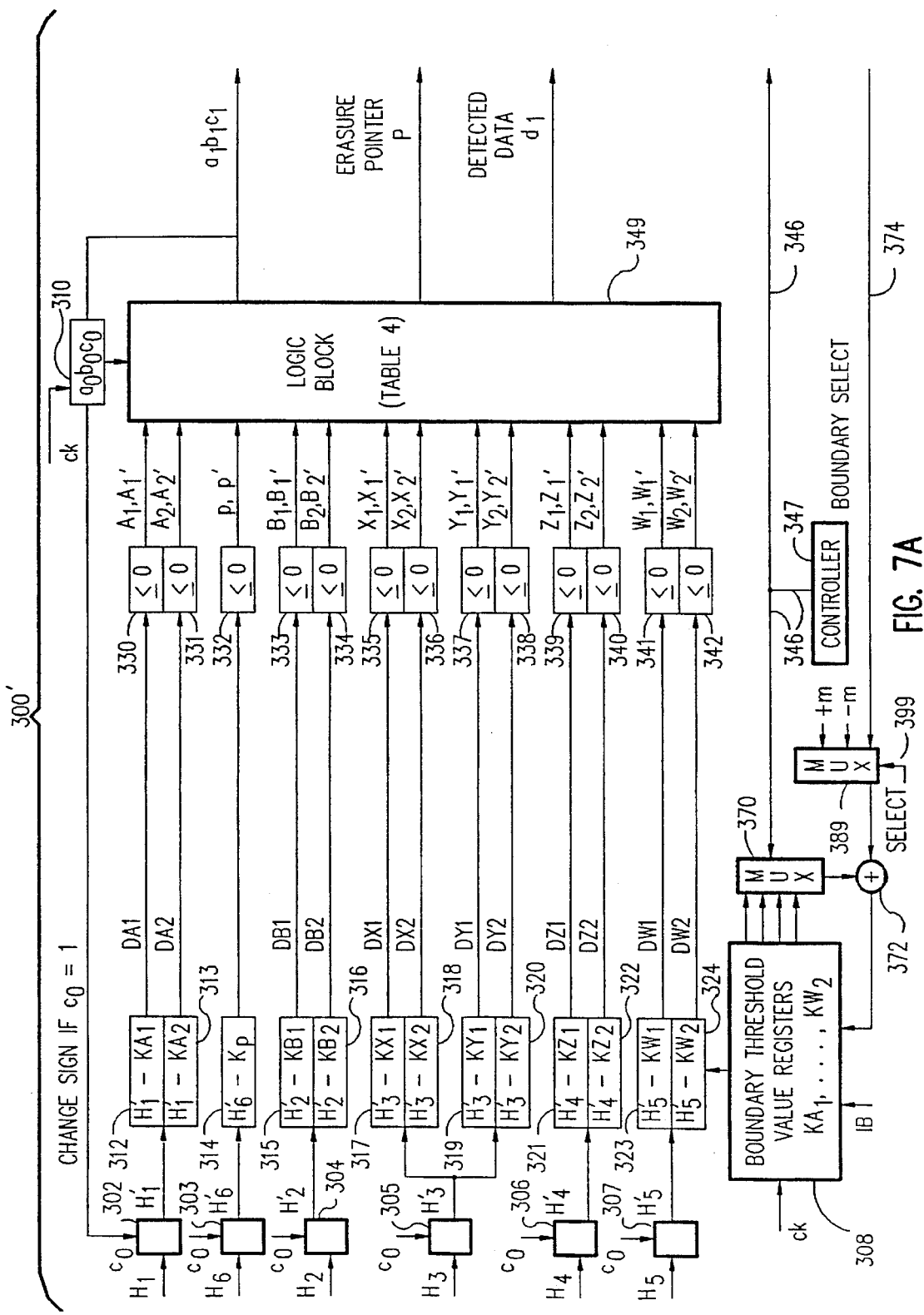
FIGS. 7A and 7B, when taken together, constitute a schematic diagram that depicts a modification of the decoder apparatus illustrated in FIGS. 6A and 6B to show a variation of the manner in which the invention may be implemented.
Figure 7B:
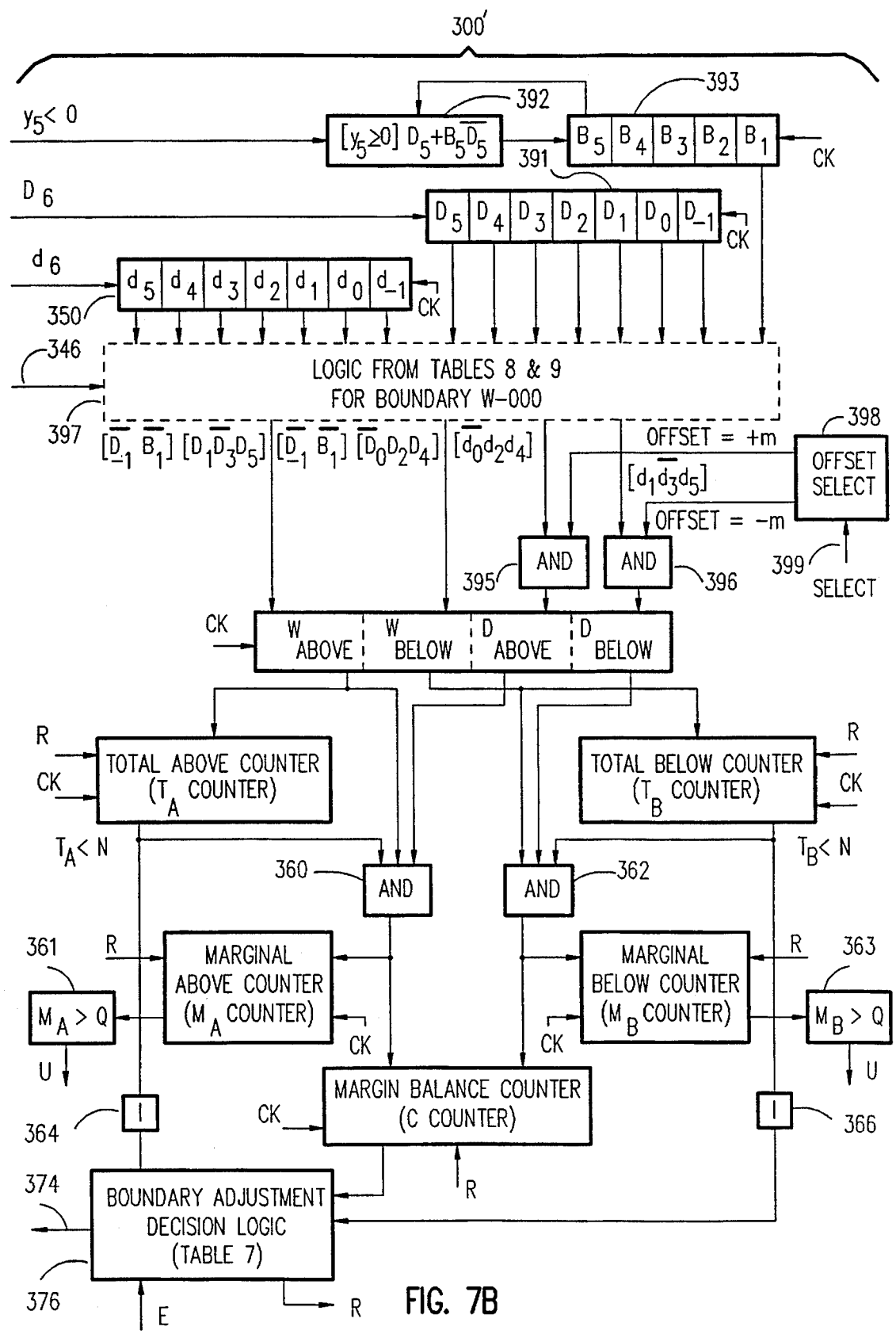

FIGS. 7A and 7B, taken together, illustrate a decoder 300' which is a variation of the decoding apparatus and method depicted in FIGS. 6A and 6B for implementing the invention to optimize the W2 boundary. Identical blocks in the two sets of figures have been designated with the same reference numerals. As in Section IIA hereof, the initial values of the threshold-boundary constants are loaded into the appropriate ones of registers 308 via bus IB.

This approach differs from that described in Section IIA in that instead of requiring direct calculation of the error margin $DW2=H'_5-KW2$, the boundary threshold is moved upward m units and then downward m units from KW2. While moved upward, counter $M_A$ counts the number of times the value of the linear function $H'_5$ is at or below boundary KW2+m; and later while moved downward, counter $M_B$ counts the number of times the value of $H'_5$ is above the boundary KW2−m. Since error margin calculation is not required in this method, subtractors 312–324 and comparators 330–342 may be combined into a single set of comparators, such as taught in FIG. 4 of Reference 2.

This method requires that the correct value of the detected data sequence $\{d_i\}$ be known in advance. This known data sequence will be designated $\{D_i\}$ to distinguish it from $\{d_i\}$. When $\{D_i\}$ is known, it is possible to construct the phase polarity sequence $\{B_i\}$. The sequence $\{B_i\}$ represents the signal phase at the ith clock cycle according to the convention:

$$B_i = \begin{cases} 0 & \text{if phase is positive} \\ 1 & \text{if phase is negative} \end{cases}$$

and is computed recursively in logic circuitry of 392 and stored in shift register 393 by:

$$B_{i+1}=[y_i \geq 0]D_i+B_i\overline{D_i}.$$

The comparators 356, 358 of FIG. 6B are replaced in FIG. 7B with AND gates 395 and 396, which have as inputs indicators of the current boundary offset, +m or −m, together with logic expressions for the detected data above and below the preselected W2 decision boundary. An offset select circuit 398 will be conditioned by select line 399 to provide a signal to the AND gate 395 or 396 depending upon whether the offset + m or −m, respectively, has been selected First, the W2 boundary is selected by MUX 370. The value of its boundary threshold KW2 provides one of the two inputs to adder 372. The other input comes from MUX 389 and is selected via line 399. The W2 boundary is moved upward by m units from its initial value KW2 by adding at 372 the value +m from MUX 389 and loading the new value of KW2 in the appropriate register 308 via bus IB.

The detected data $d_6$ from the decoder is fed into the shift register 350; and the corresponding known data $D_6$, provided either by pattern generator 380 (as in FIG. 6A) or by a source external to the hardware, is fed into shift register 391. Block 392 evaluates the next signal phase using the current signal phase $B_5$ from shift register 393, the known data. $D_5$, and the sign bit of the sample value $y_5$.

Circuit 397 executes the logic of Tables 8 and 9 for detecting an occurrence of the known N2 data pattern $D_0D_1D_2D_3D_4D_5$=010001 at state 000, indicating that the known pattern is above the W2 boundary. This provides a logical "1" input to the register $W_{above}$. If, simultaneously, the detected data is the M8 pattern, $d_0d_1d_2d_3d_4d_5$=001010, then the logic of Table 9 detects this as a detected pattern below the W2 boundary and AND gate 395 provides a logical "1" input to the register $D_{above}$. The components shown below the $W_{above}$, $W_{below}$, $D_{above}$ and $D_{below}$ registers are identical to the ones in FIG. 6B and function in the same way.

As in Section IIA, counter $T_A$ counts occurrences of the N2 data pattern $D_0D_1D_2D_3D_4D_5$= 010001 (i.e., where $W_{above}$=1), counter $M_A$ counts occurrences of potential errors indicated by the downward crossing of the moved. W2 boundary when the detected pattern is the M8 pattern $d_0d_1d_2d_3d_4d_5$=001010 (where $D_{above}$=1), and counter C counts down by the number of these downward crossing errors. (The reader is referred to Section IIA for a detailed description of the counters and other identical blocks.) When counter $T_A$ reaches N, the W2 boundary is reloaded in register 308 to its initial value KW2 via bus IB.

Next, the W2 boundary is moved downward by m units from its initial value KW2 by adding to its initial value at 372 the value −m selected through multiplexer 389, and loading this new value of KW2 into the appropriate one of the registers 308.

Detected data $d_6$ from the decoder is fed into shift register 350 and the corresponding known data $D_6$ is fed into shift register 391. Block 392 evaluates the next signal phase using the current signal phase $B_5$ from shift register 393, the known data $D_5$, and the sign bit of the sample value $y_1$.

Circuit 397 executes the logic of Tables 8 and 9 to detect an occurrence of the known M8 data pattern $D_0D_1D_2D_3D_4D_5$= 001010 at state 000, indicating that the known pattern is below the W2 boundary. This provides a logical "1" input to the register $W_{below}$. If, simultaneously, the detected data is the N2 pattern $d_0d_1d_2d_3d_4d_5$=010001, then the logic of Table 9 detects this as a pattern above the W2 boundary and AND gate 396 provides a logical "1" input to register $D_{below}$.

As described in connection with Section IIA, counter $T_B$ counts occurrences of the M8 data pattern $D_0D_1D_2D_3D_4D_5$= 001010 (i.e., where $W_{below}$=1), counter $M_B$ counts occurrences of apparent errors indicated by downward crossing of the W2 boundary when the detected pattern is the N2 pattern $d_0d_{1/d2}d_3d_4d_5$=010001 (i.e., where $D_{below}$=1), and counter C counts up by the number of upward crossing errors. When counter $T_B$ reaches N, the W2 boundary is reset to its initial value KW2.

The final result in counter C in conjunction with Boundary Adjustment Decision Logic of Table 8 generates one of three values: +1, −1, or 0. This value is added to the current KW2 boundary value at adder 372 using the MUX 389 and MUX 370.

The above process is repeated recursively until the stop condition as described in Table 7 occurs, denoting that optimization for the W2 boundary has been achieved.

The process, as described for the W2 boundary, is repeated to optimize the other boundaries in a similar manner. The boundary to be optimized is selected by the boundary select controller 347, which conditions MUX 370. Also a signal in line 346 causes the logic from Tables 8 and 9 to provide appropriate logic expressions corresponding to the selected boundary to the registers $W_{above}$, $W_{below}$, $D_{above}$ and $D_{below}$.

For sake of simplification, in the embodiments as disclosed, it has been assumed that the objective is to balance the potential error events above and below each decision boundary. However, if desired, the objective may be modified to bias the potential error events toward one side of the decision boundary, such as to favor detection of a "1" as opposed to a "0". In such case, the values of +m and −m would be replaced by unequal values $m_1$ and $m_2$, respectively. Similarly, the values of the preselected numbers +S and −S for the C counter may also be replaced by unequal values $S_1$ and $S_2$, respectively, to bias the adjustment of the decision boundary to favor detection of one preselected data pattern versus the other. Likewise, the preselected value of N for counter $T_A$ and that for the counter $T_B$ may be replaced by constants $N_1$ and $N_2$, respectively, to maximize use of available data where one preselected data pattern is significantly more prevalent than the other preselected data pattern. Hence, in the claims, unless otherwise stated, use of $m_1$, $m_2$ and $S_1$, $S_2$ and $N_1$, $N_2$ are intended generically to cover either equal or unequal values for these respective constants.

While the invention has been particularly shown and described with reference to preferred embodiments thereof, it will be understood by those skilled in the art that the foregoing and other changes may be made therein without departing from the spirit, scope and teaching of the invention. Accordingly, the invention herein disclosed is to be considered merely as illustrative and limited in scope only as specified in the claims.

TABLE 1

| Precomputed Functions of Sample Values | Sample Functions | | |
|---|---|---|---|
| | Threshold | N Patterns | M Patterns |
| Baseline Check | | | |
| $H_1 = (y_0 + 2y_1 + y_2)$ | KA | N1, N2 | M1, M2, M3 |
| $H_2 = (y_0 + 2y_1 + y_2 - y_3)$ | KB | N4, N5 | M1, M2 |
| Peak Position Check | | | |
| $H_3 = (y_0 + y_1) - (y_2 + y_3)$ | KX | N1, N2 | M6, M7 |
| | KY | N3 | M8 |
| $H_4 = (y_0 + y_1 - y_2 + 2y_4)$ | KZ | N1 | M8 |
| $H_5 = y_0 + y_1 - y_2 + y_4 - y_5$ | KW | N2 | M8A |

TABLE 2

Possible Sequences - State 000 - 6-Sample Look-Ahead

| | $y_0$ | $y_1$ | $y_2$ | $y_3$ | $y_4$ | $y_5$ |
|---|---|---|---|---|---|---|
| M1a | 0 | 0 | 0 | 0 | 0 | 0 |
| M1b | 0 | 0 | 0 | 0 | 0 | 2 |
| M2 | 0 | 0 | 0 | 0 | 2 | 4 |
| M3a | 0 | 0 | 0 | 2 | 4 | 2 |
| M3b | 0 | 0 | 0 | 2 | 4 | 0 |
| M4a | 0 | 0 | 2 | 4 | 2 | 0 |
| M4b | 0 | 0 | 2 | 4 | 2 | −2 |
| M5 | 0 | 0 | 2 | 4 | 0 | −4 |
| M6a | 0 | 2 | 4 | 2 | 0 | 0 |
| M6b | 0 | 2 | 4 | 2 | 0 | −2 |
| M7 | 0 | 2 | 4 | 2 | −2 | −4 |
| M8a | 0 | 2 | 4 | 0 | −4 | −2 |
| M8b | 0 | 2 | 4 | 0 | −4 | 0 |
| N1a | 2 | 4 | 2 | 0 | 0 | 0 |
| N1b | 2 | 4 | 2 | 0 | 0 | −2 |
| N2 | 2 | 4 | 2 | 0 | −2 | −4 |
| N3a | 2 | 4 | 2 | −2 | −4 | −2 |
| N3b | 2 | 4 | 2 | −2 | −4 | 0 |
| N4a | 2 | 4 | 0 | −4 | −2 | 0 |
| N4b | 2 | 4 | 0 | −4 | −2 | 2 |
| N5 | 2 | 4 | 0 | −4 | 0 | 4 |

TABLE 3

Classification of (1,7) ML Boundaries

| State | Boundary Type | | | | | |
|---|---|---|---|---|---|---|
| | A | B | X | Y | Z | W |
| 000 | $KA2^+$ | $KB2^+$ | $KX2^+$ | $KY2^+$ | $KZ2^+$ | $KW2^+$ |
| 100 | $KA1^+$ | $KB1^+$ | $KX1^+$ | $KY1^+$ | $KZ1^+$ | $KW1^+$ |
| 111 | $KA2^-$ | $KB2^-$ | $KX2^-$ | $KY2^-$ | $KZ2^-$ | $KW2$ |
| 011 | $KA1^-$ | $KB1^-$ | $KX1^-$ | $KY1^-$ | $KZ1^-$ | $KW1$ |

TABLE 4

Intermediate Logic and Output Logic

1. Decoded Data and Pointer $d_0 = b_0\bar{c}_0 + \bar{b}_0 c_0$
$P = p\bar{b}_0\bar{c}_0 + p'b_0 c_0$ 2. Intermediate Logic $R_1 = A_1 B_1 + X_1 + Y_1 Z_1 W_1$   $R'_1 = A'_1 B'_1 + X'_1 + Y'_1 Z'_1 W'_1$
$R_2 = A_2 B_2 + X_2 + Y_2 Z_2 W_2$   $R'_2 = A'_2 B'_2 + X'_2 + Y'_2 Z'_2 W'_2$ 3. Next State $a_1 = p\bar{b}_0\bar{c}_0 + b_0\bar{c}_0 + \bar{p}b_0 c_0$
$b_1 = p\bar{b}_0\bar{c}_0 + \bar{p}c_0 + \bar{b}_0 c_0$
$c_1 = p\bar{b}_0 + \bar{b}_0 c_0 + \bar{R}_1 \bar{b}_0 a_0 + \bar{R}_2 \bar{a}_0 \bar{c}_0 + \bar{p}R'_1 \bar{a}_0 b_0 + \bar{p}R'_2 a_0 c_0$

TABLE 5

State at Time of Detecting $d_1$

| $d_{-1}$ | $b_1$ | Logic Expression | State |
|---|---|---|---|
| 0 | 0 | $\overline{d_{-1}b_1}$ | 000 |
| 1 | 0 | $d_{-1}\bar{b}_1$ | 100 |
| 0 | 1 | $\bar{d}_{-1}b_1$ | 111 |
| 1 | 1 | $d_{-1}b_1$ | 011 |

TABLE 6

Pattern Identification Logic

| Boundary | Nearest Above the Boundary Data Pattern $d_0, d_1, d_2, d_3, d_4, d_5$ | Logic Expression | Nearest Below the Boundary Data Pattern $d_0, d_1, d_2, d_3, d_4, d_5$ | Logic Expression |
|---|---|---|---|---|
| A | 0, 1, 0, 0, Ø, Ø | $d_1\overline{d_3}$ | 0, 0, 0, 0, Ø, Ø | $\overline{d_0 d_1 d_2 d_3}$ |
| B | 0, 1, 0, 1, 0, Ø | $d_1(d_3 + d_4)$ | 0, 0, 0, 0, Ø, Ø | $\overline{d_0 d_1 d_2 d_3}$ |
|   | 0, 1, 0, 0, 1, 0 |   |   |   |
| X | 0, 1, 0, 0, 0, Ø | $d_1\overline{d_3 d_4}$ | 0, 0, 1, 0, 0, Ø | $\overline{d_1 d_2 d_4}$ |
| Y | 0, 1, 0, 0, 1, 0 | $d_1\overline{d_4}$ | 0, 0, 1, 0, 1, 0 | $\overline{d_0 d_2 d_4}$ |
| Z | 0, 1, 0, 0, 0, 0 | $d_1\overline{d_3 d_4 d_5}$ | 0, 0, 1, 0, 1, 0 | $\overline{d_0 d_2 d_4}$ |
| W | 0, 1, 0, 0, 0, 1 | $d_1\overline{d_3}d_5$ | 0, 0, 1, 0, 1, 0 | $\overline{d_0 d_2 d_4}$ |

TABLE 7

Boundary Adjustment Decision Table

| Counter Values | | | Change In Boundary |
|---|---|---|---|
| $T_A$ | $T_B$ | C | Constant |
| <N | Ø | Ø | 0 |
| Ø | <N | Ø | 0 |
| N | N | ≧ +S | add 1 |
| N | N | ≦ −S | subtract 1 |
| N | N | −S < 0 < +S | stop adjustments |

TABLE 8

State at Time of Apparent Error

| $D_{-1}$ | $B_1$ | Logic Expression | State |
|---|---|---|---|
| 0 | 0 | $\overline{D_{-1}B_1}$ | 000 |
| 1 | 0 | $D_{-1}\overline{B_1}$ | 100 |
| 0 | 1 | $\overline{D_{-1}}B_1$ | 111 |
| 1 | 1 | $D_{-1}B_1$ | 011 |

TABLE 9

Boundary Crossing Detection Logic

| Expected Pattern Below $D_0, D_1, D_2, D_3, D_4, D_5$ | Logic Expression | Received Pattern Above $d_0, d_1, d_2, d_3, d_4, d_5$ | Logic Expression | Boundary (Direction Crossed) |
|---|---|---|---|---|
| 0, 0, 0, 0, Ø, Ø | $\overline{D_0 D_1 D_2 D_3}$ | 0, 1, 0, 0, Ø, Ø | $d_1\overline{d_3}$ | A (up) |
| 0, 0, 0, 0, Ø, Ø | $\overline{D_0 D_1 D_2 D_3}$ | 0, 1, 0, 1, 0, Ø | $d_1(d_3 + d_4)$ | B (up) |
|   |   | 0, 1, 0, 0, 1, 0 |   |   |
| 0, 0, 1, 0, 0, Ø | $\overline{D_0 D_2 D_4}$ | 0, 1, 0, 0, 0, Ø | $d_1\overline{d_3 d_4}$ | X (up) |
| 0, 0, 1, 0, 1, 0 | $\overline{D_0}D_2\overline{D_4}$ | 0, 1, 0, 0, 1, 0 | $d_1\overline{d_3 d_4}$ | Y (up) |
| 0, 0, 1, 0, 1, 0 | $\overline{D_0}D_2\overline{D_4}$ | 0, 1, 0, 0, 0, 0 | $d_1\overline{d_3 d_4 d_5}$ | Z (up) |
| 0, 0, 1, 0, 1, 0 | $\overline{D_0}D_2\overline{D_4}$ | 0, 1, 0, 0, 0, 1 | $d_1\overline{d_3}d_5$ | W (up) |

| Expected Pattern Above $D_0, D_1, D_2, D_3, D_4, D_5$ | Logic Expression | Received Pattern Below $d_0, d_1, d_2, d_3, d_4, d_5$ | Logic Expression | Boundary (Direction Crossed) |
|---|---|---|---|---|
| 0, 1, 0, 0, Ø, Ø | $D_1\overline{D_3}$ | 0, 0, 0, 0, Ø, Ø | $\overline{d_0 d_1 d_2 d_3}$ | A (down) |
| 0, 1, 0, 1, 0, Ø | $D_1(D_3 + D_4)$ | 0, 0, 0, 0, Ø, Ø | $\overline{d_0 d_1 d_2 d_3}$ | B (down) |
| 0, 1, 0, 0, 1, 0 |   |   |   |   |
| 0, 1, 0, 0, 0, Ø | $D_1\overline{D_3 D_4}$ | 0, 0, 1, 0, 0, Ø | $\overline{d_0 d_2 d_4}$ | X (down) |
| 0, 1, 0, 0, 1, 0 | $D_1\overline{D_3 D_4}$ | 0, 0, 1, 0, 1, 0 | $\overline{d_0}d_2\overline{d_4}$ | Y (down) |
| 0, 1, 0, 0, 0, 0 | $D_1\overline{D_3 D_4 D_5}$ | 0, 0, 1, 0, 1, 0 | $\overline{d_0}d_2\overline{d_4}$ | Z (down) |
| 0, 1, 0, 0, 0, 1 | $D_1\overline{D_3}D_5$ | 0, 0, 1, 0, 1, 0 | $\overline{d_0}d_2\overline{d_4}$ | W (down) |

Program Listing for BOUNDARY

```
    ∇    Y BOUNDARY43 D17;⎕IO;I;SS
[ 1]     ⍝***********                    ******************************
[ 2]     ⍝Inputs:            Y = Sequence of Analog Sample Values
[ 3]     ⍝                   D17 = Corresponding Data Sequence
[ 4]     ⍝Outputs:           KPOS = Boundaries for Positive States 000 and 100
[ 5]     ⍝                   KNEG = Boundaries for Negative States 111 and 011
[ 6]     ⎕IO←1                                          ⍝Set Index Origin
[ 7]     KI←(4,6)ρ0                              ⍝To accumulate thresholds
[ 8]     SS←(4,6,2)ρ0                            ⍝To accumulate sample sizes
[ 9]     ⍝****Compute State 000, 110, 111, 011 Thresholds when I=1,2,3,4
[10]     I←0
[11]     DNRZ←DNRZ≠0<+/Y×(D17∧DNRZ←≠\D17)  ⍝Indicator of Positive Phase
[12]     AGAIN:I←I+1                             ⍝Loop on State
[13]     ⍞(I=3)/'Y←-Y'                           ⍝Reverse sign for Negative Phase
[14]     ⍞(I=3)/'DNRZ←~DNRZ'                     ⍝Indicator of Negative Phase
[15]     ⍝********************** Precomputed Functions of Sample Values
[16]     H1←Y+(2×1ϕY)+2ϕY
[17]     H2←H1-(3ϕY)
[18]     H3←Y+(1ϕY)-(2ϕY)+3ϕY
[19]     H4←H3+(3ϕY)+2×(4ϕY)
[20]     H5←H4-(5ϕY)+(4ϕY)
[21]     ⍝***************** E contains all locations of State I within D17
[22]     E←DNRZ[E]/E←-1+(+\D17)ι+/(⁻1↓D17)
[23]     ⍞(I∊1 3)/'E←DNRZ[E]/E←-1+(+\(~D17))ι+/(⁻1↓~D17)'
[24]     E←(~D17[E])/E                   ⍝Eliminate Transition States: D17[0]=1
[25]     E←(E≤(ρD17)-6)/E                ⍝Truncate last 6 samples
[26]     ⍝*****************E0ijk . . . = Locations of Data Pattern (0,i,j,k, . . .)
[27]     S←ρE01001←(D17[E+1]∧D17[E+4])/E                              ⍝N3
[28]     S←S,ρE0101←(D17[E+1])∧D17[E+3])/E                            ⍝N4,N5
[29]     S←S,ρE01000←(D17[E+1]∧(~D17[E+3])∧~D17[E+4])/E               ⍝N1,N2
[30]     S←S,ρE010001←(D17[E+1]∧(~D17[E+3])∧D17[E+5])/E               ⍝N2
[31]     S←S,ρE010000←(D17[E+1]∧(~D17[E+3])∧(~D17[E+4])∧(~D17[E+5]))/E ⍝N1
[32]     S←S,ρE00101←(D17[E+2]∧D17[E+4])/E                            ⍝M8
[33]     S←S,ρE0010100←(D17[E+2]∧D17[E+4]∧~D17[E+6])/E                ⍝M8A
[34]     S←S,ρE00100←(D17[E+2]∧~D17[E+4])/E                           ⍝M6, M7
[35]     S←S,ρE0000←((~D17[E+1])∧(~D17[E+2])∧(~D17[E+3]))/E           ⍝M1,M2,M3
[36]     S←S,ρE00000←((~D17[E+1])∧(~D17[E+2])∧(~D17[E+3])∧(~D17[E+4]))/E ⍝M1,M2
[37]     SS[I;;1]←S[3 2 3 1 5 4]                         ⍝N Sample sizes
[38]     SS[I;;2]←S[9 10 8 6 6 7]                        ⍝M Sample sizes
[39]     ⍝***KI[I;J] is average of cloud means closest to (I,J) Boundary
[40]     KI[I;1]←(((+/H1[E01000])÷ρE01000)+(+/H1[E0000])÷ρE0000)÷2
[41]     KI[I;2]←(((+/H2[E0101])÷ρE0101)+(+/H2[E00000])÷ρE00000)÷2
[42]     KI[I;3]←(((+/H3[E01000])÷ρE01000)+(+/H3[E00100])÷ρE00100)÷2
[43]     KI[I;4]←(((+/H3[E01001])÷ρE01001)+(+/H3[E00101])÷ρE00101)÷2
[44]     KI[I;5]←(((+/H4[E010000])÷ρE010000)+(+/H4[E00101])÷ρE00101)÷2
[45]     KI[I;6]←(((+/H5[E010001])÷ρE010001)+(+/H5[E0010100])÷ρE0010100)÷2
[46]     →(I<4)/AGAIN  ⍝*********************** Repeat for four states
[47]     KPOS←L.5+KI[1;],KI[2;]                  ⍝Round to nearest integer
[48]     KNEG←L.5+KI[3;],KI[4;]
[49]     END:SHOTHRESH           ⍝Display thresholds and Sample Sizes
    ∇            4:24PM 7/17/89
```

We claim:

1. A method for improving data detection reliability in a coded signal processing channel in which digital electrical signals representing digital sample values are generated from analog signals read by a transducer from binary data recorded on a data storage medium, comprising the steps of:

providing a plurality of threshold constants whose values define initial decision boundaries for use in determining whether detected binary data corresponding to a coded sequence of a runlength limited (RLL) code is a "1" or a "0;

processing detected binary data on-line for measuring error margins at each of a plurality of respective decision boundaries by using an abstract relationship between each preselected decision boundary and specific sequences of the detected binary data that are defined by corresponding Boolean logical expressions;

determining potential error events in the detected binary data by counting in two separate counters numbers of times actual values of one of a plurality of linear functions of the digital sample values corresponding to one preselected data pattern are within $m_1$ units above and corresponding to another preselected data pattern are within $m_2$ units below, respectively, a preselected one of said boundaries;

accumulating in a margin balance counter a count having a magnitude and sign denoting difference between counts in said separate counters; and responsive to a predesignated event, adjusting the preselected decision boundary upwardly if the count in the margin balance counter at least equals a preselected number $+S_1$ or downwardly if the last-mentioned count is not greater than a preselected number $-S_2$ to create an updated decision boundary.

2. The method of claim 1, including executing the adjusting step during a read operation.

3. The method of claim 1, including executing the adjusting step during a time out between successive read operations.

4. The method of claim 1, including the steps of:

calculating an error margin distance representing the difference between actual values of said one linear function of the digital sample values and a corresponding one of the threshold constants; and using said error margin distance corresponding to the preselected data patterns for determining whether each actual value is within $m_1$ units above or $m_2$ units below the preselected boundary.

5. The method of claim 1, wherein $m_1=m_2$.

6. The method of claim 1, wherein said predesignated event is the counting of a total of at least $N_1$ one preselected data patterns and at least $N_2$ another preselected data patterns, irrespective of distance from the preselected boundary.

7. The method of claim 6, wherein $N_1=N_2$.

8. The method of claim 6, wherein $S_1<N_1$ and $S_2<N_3$.

9. The method of claim 1, including the step of using said updated decision boundary for determining whether the detected binary data corresponding to a coded sequence of a runlength limited (RLL) code is a "1" or a "0".

10. Apparatus for improving data detection reliability in a coded signal processing channel in which digital electrical signals representing digital sample values are generated from analog signals read by a transducer from binary data recorded on a data storage medium, comprising:

means (308) for storing a plurality of threshold constants whose values define decision boundaries for use in determining whether detected binary data corresponding to a respective coded sequence of a runlength limited (RLL) code is a "1" or a "0";

means (including 351) for processing binary data on-line for measuring error margins at each of a plurality of respective decision boundaries by using an abstract relationship between each preselected decision boundary and specific sequences of the detected binary data that are defined by corresponding Boolean logical expressions;

means for determining potential error events in the detected binary data (d), comprising two separate counters ($M_A$, $M_B$) for counting numbers of times actual values of one of a plurality of linear functions of the digital sample values corresponding to one preselected data pattern are within $m_1$ units above and corresponding to another preselected data pattern are within $m_2$ units below, respectively, a preselected one of said boundaries;

a margin balance counter (C) for accumulating a count having a magnitude and sign denoting difference between counts in said separate counters; and circuitry (376) responsive to a predesignated control event for adjusting the preselected decision boundary upwardly if the count in the margin balance counter at least equals a preselected number $+S_1$ or downwardly if the last-mentioned count is not greater than a preselected number $-S_2$.

11. The apparatus of claim 10, wherein said one preselected data pattern and another preselected data pattern are those closest above and closest below, respectively, said preselected boundary.

12. The apparatus of claim 10, including two total counters ($T_A$, $T_B$) for counting, and initiating said predesignated control event upon occurrence of, both $N_1$ one preselected data patterns and $N_2$ another preselected data patterns, respectively, irrespective of how far from the preselected boundary.

13. The apparatus of claim 10, including:

means (324) for calculating an error margin distance representing the difference between actual values of said one linear function of the digital sample values and a corresponding one of the threshold constants;

means (356, 358) for comparing said error margin distance with $+m_1$ and $-m_2$ for determining whether each actual value is within $m_1$ units above or $m_2$ units below the preselected boundary; and means (351, 360, 362) for gating said separate counters for counting only when said one and said another preselected data patterns occur, respectively.

14. The apparatus of claim 10 wherein $m_1=m_2$.

15. The apparatus of claim 10 wherein $S_1=S_2$.

16. Apparatus for improving data detection reliability in a coded signal processing channel in which digital electrical signals representing digital sample values are generated from analog signals read by a transducer from binary data recorded on a data storage medium, comprising:

means (308) for storing a plurality of threshold constants whose values define decision boundaries for use in determining whether detected binary data corresponding to a coded sequence of a runlength limited (RLL) code is a "1" or a "0";

means (including 351) for processing binary data on-line for measuring error margins at each of a plurality of respective decision boundaries by using an abstract relationship between each preselected decision boundary and specific sequences of the detected binary data that are defined by corresponding Boolean logical expressions;

circuitry (351) for determining potential error events in the detected binary data by generating, for a selected state, first and second outputs ($W_{above}$, $W_{below}$) corresponding to one preselected data pattern and another preselected related data pattern, respectively, above and below a preselected one of said decision boundaries;

first and second counters ($T_A$, $T_B$) for respectively counting up to preselected numbers $N_1$ and $N_2$ total occurrences of said one and another preselected data patterns above and below said preselected one boundary, respectively;

means ($W_{above}$, $W_{below}$, 356, $D_{above}$, 358, $D_{below}$) establishing error margin distances $m_1$ units above and $m_2$ units below, respectively, said preselected one boundary;

third and fourth counters ($M_A$, $M_B$) for counting numbers of times actual values of a linear function of digital sample values corresponding to said one and another preselected data patterns are respectively within $m_1$ units and $m_2$ units, respectively, of said preselected boundary;

a margin balance counter (C) for accumulating a count having a magnitude and sign denoting difference between counts in said third and fourth counters; and circuit means, conditioned by said first and second counters counting to selected numbers $N_1$ and $N_2$, respectively, for adjusting the preselected one boundary one unit up or one unit down provided the count in the margin balance counter has reached a preselected number $+S_1$ or a preselected number $-S_2$, respectively, where $S_1<N_1$ and $S_2<N_2$.

17. The apparatus of claim 16, said circuit means being responsive to the counts in said first and second counters reaching $N_1$ and $N_2$, respectively, before the count in the margin balance counter reaches $+S_1$ or $-S_2$ to terminate boundary adjustment, for thereby defining preselected error margins for said data patterns above and below said preselected boundary.

18. The apparatus of claim 16, including means for resetting all of said counters whenever the boundary is adjusted.

19. The apparatus of claim 16, including circuitry responsive to the count in either said third or fourth counter exceeding a preselected number Q less than $N_1$ or $N_2$ to produce a signal (U) indicating performance of the channel is unacceptable.

20. The apparatus of claim 16, including means providing a signal (E) for enabling each of said counters during reading of data from the storage medium to permit initiation of a boundary adjustment.

21. The apparatus of claim 16, comprising:
   means providing a plurality of sets of preselected data patterns for which the actual values of the functions of digital sample values are to be measured against related decision boundaries; and
   means including a multiplexor (MUX) for selecting one set of the data patterns at a time for measurement and boundary adjustment.

22. Apparatus for improving data detection reliability in a coded signal processing channel comprising:
   a magnetic recording medium;
   a transducer for generating analog signals from digital data recorded on the recording medium;
   means for generating from the analog signals digital signals representing digital sample values;
   means (308) for storing a plurality of threshold constants whose values define decision boundaries for use in determining whether detected binary data corresponding to a coded sequence of a runlength limited (RLL) code is a "1" or a "0";
   means (including 351) for processing binary data on-line for measuring error margins at each of a plurality of respective decision boundaries by using an abstract relationship between each preselected decision boundary and specific sequences of the detected binary data that are defined by corresponding Boolean logical expressions;
   means for determining potential error events in the detected binary data (d), comprising two separate counters ($M_A$, $M_B$) for counting numbers of times actual values of one of a plurality of linear functions of the digital sample values corresponding to one preselected data pattern are within $m_1$ units above and corresponding to another preselected data pattern are within $m_2$ units below, respectively, a preselected one of said boundaries;
   a margin balance counter (C) for accumulating a count having a magnitude and sign denoting difference between counts in said separate counters; and
   circuitry (376) responsive to a predesignated control event for adjusting the preselected decision boundary upwardly if the count in the margin balance counter at least equals a preselected number $+S_1$ or downwardly if the latter count is not greater than a preselected number $-S_2$.

23. The apparatus of claim 22, including:
   means (324) for calculating an error margin distance representing the difference between actual values of said one linear function of the digital sample values and a corresponding one of the threshold constants;
   means (356, 358) for comparing said error margin distance with $+m_1$ and $-m_2$ for determining whether each actual value is within $m_1$ units above or $m_2$ units below the preselected boundary; and
   means (351, 360, 362) for gating said separate counters for counting only when said one and said another preselected data patterns occur, respectively.

24. A method for improving data detection reliability in a coded signal processing channel in which digital electrical signals representing digital sample values are generated from analog signals read by a transducer from binary data recorded on a data storage medium, comprising the steps of:
   providing a plurality of threshold constants whose values define initial decision boundaries for use in determining whether detected binary data corresponding to a coded sequence of a runlength limited (RLL) code is a "1" or a "0";
   processing known data corresponding to the detected binary data on-line for measuring error margins at each of a plurality of respective decision boundaries by using an abstract relationship between each preselected decision boundary and specific sequences of said known data that are defined by corresponding Boolean logical expressions;
   determining potential error events in the detected binary data by counting in two separate counters numbers of times actual values of one of a plurality of linear functions of the digital sample values corresponding to one preselected data pattern are within $m_1$ units above and one of a different plurality of linear functions of the digital sample values corresponding to another preselected data pattern are within $m_2$ units below, respectively, a preselected one of said boundaries;
   accumulating in a margin balance counter a count having a magnitude and sign denoting difference between counts in said separate counters; and
   responsive to a predesignated event, adjusting the preselected decision boundary upwardly if the count in the margin balance counter at least equals a preselected number $+S_1$ or downwardly if the last-mentioned count is not greater than a preselected number $-S_2$ to create an updated decision boundary.

25. The method of claim 24, including the step of using said updated decision boundary for determining whether the detected binary data corresponding to a coded sequence of a runlength limited (RLL) code is a "1" or a "0".

26. Apparatus for improving data detection reliability in a coded signal processing channel in which digital electrical signals representing digital sample values are generated from analog signals read by a transducer from binary data recorded on a data storage medium, comprising:
   means (308) for storing a plurality of threshold constants whose values define decision boundaries for use in determining whether detected binary data corresponding to a respective coded sequence of a runlength limited (RLL) code is a "1" or a "0";
   means (including 351) for processing known data corresponding to the detected binary data on-line for measuring error margins at each of a plurality of respective decision boundaries by using an abstract relationship between each preselected decision boundary and specific sequences of said known data that are defined by corresponding Boolean logical expressions;
   means for determining potential error events in the detected binary data (d), comprising two separate counters ($M_A$, $M_B$) for counting numbers of times actual values of one of a plurality of linear functions of the digital sample values corresponding to one preselected data pattern are within $m_1$ units above and corresponding to another preselected data pattern are within $m_2$ units below, respectively, a preselected one of said boundaries;
   a margin balance counter (C) for accumulating a count having a magnitude and sign denoting difference between counts in said separate counters; and circuitry (376) responsive to a predesignated control event for adjusting the preselected decision boundary upwardly if the count in the margin balance counter at least equals a preselected number $+S_1$ or downwardly if the last-mentioned count is not greater than a preselected number $-S_2$.

27. The apparatus of claim 26, including means (380) for providing as the known binary data a data stream having a length and diversity that assures it is statistically reliable.

28. A method for improving data detection reliability in a coded signal processing channel in which digital electrical signals representing digital sample values are generated from analog signals read by a transducer from binary data recorded on a data storage medium, comprising the steps of:

providing a plurality of threshold constants whose values define initial decision boundaries for use in determining whether detected binary data corresponding to a coded sequence of a runlength limited (RLL) code is a "1" or a "0";

recording known binary data on the storage mediums processing detected binary data on-line for inferring error margins at each of a plurality of respective decision boundaries by using an abstract relationship between each preselected decision boundary and specific sequences of the detected binary data and corresponding sequences of the known recorded binary data that are defined by corresponding Boolean logical expressions by (i) moving a selected one of the initial decision boundaries upward $m_1$ units and then downward $m_2$ units from an initial preselected value, and (ii) while the selected boundary is moved (a) upward and then (b) downward, counting in separate counters numbers of times (a) a specific data sequence of the known recorded binary data that should be above the selected boundary is detected as a data sequence below said selected boundary and (b) a specific data sequence of the known recorded binary data that should be below said selected boundary is detected as a data sequence above said selected boundary, respectively;

accumulating in a margin balance counter a count having a magnitude and sign denoting difference between counts in said separate counters; and responsive to a predesignated event, adjusting the preselected decision boundary upwardly if the count in the margin balance counter at least equals a preselected number $+S_1$ or downwardly if the last-mentioned count is not greater than a preselected number $-S_2$ to create an updated decision boundary.

29. The method of claim 28, including executing the adjusting step dynamically during a time-out between consecutive read operations.

30. The method of claim 28, including the step of using said updated decision boundary for determining whether the detected binary data corresponding to a coded sequence of a runlength limited (RLL) code is a "1" or a "0".

31. Apparatus for improving data detection reliability in a coded signal processing channel in which digital electrical signals representing digital sample values are generated from analog signals read by a transducer from binary data recorded on a data storage medium, comprising:

means (308) for storing a plurality of threshold constants whose values define decision boundaries for use in determining whether detected binary data corresponding to a coded sequence of a runlength limited (RLL) code is a "1" or a "0";

means (including 397, $W_{above}$, $W_{below}$, 360, 362) for processing detected binary data on-line for inferring error margins at each of a plurality of respective decision boundaries by using an abstract relationship between each preselected decision boundary and specific sequences of the detected binary data and corresponding sequences of known recorded binary data that are defined by corresponding Boolean logical expressions;

means (including 399, 398, 395, 396) operative during detection of binary data corresponding to the known recorded data for moving a selected one of the decision boundaries upward $m_1$ units and then downward $m_2$ units from an initial preselected value;

two separate counters ($M_A$, $M_B$) operative while the selected boundary is moved (a) upward and then (b) downward for counting number of times (a) a specific sequence of the detected binary data that should be above the selected boundary is detected as a data sequence below said selected boundary and (b) number of times a sequence of the detected binary data that should be below said selected boundary is detected as a data sequence above said selected boundary, respectively;

a margin balance counter (C) for accumulating a count having a magnitude and sign denoting difference between counts in said separate counters; and circuitry (376) responsive to a predesignated control event for adjusting the selected decision boundary upwardly if the count in the margin balance counter at least equals a preselected number $+S_1$ or downwardly if the last-mentioned count is not greater than a preselected number $-S_2$.

32. Apparatus for improving data detection reliability in a coded signal processing channel comprising:

a magnetic recording medium;

a transducer for generating analog signals from binary data recorded on the recording medium;

means for generating from the analog signals digital signals representing digital sample values;

means (308) for storing a plurality of threshold constants whose values define decision boundaries for use in determining whether detected binary data corresponding to a coded sequence of a runlength limited (RLL) code is a "1" or a "0";

means (including 397, $W_{above}$, $W_{below}$, 360, 362) for processing detected binary data on-line for inferring error margins at each of a plurality of respective decision boundaries by using an abstract relationship between each preselected decision boundary and specific sequences of the detected binary data and corresponding sequences of known recorded binary data that are defined by corresponding Boolean logical expressions;

means (including 399, 398, 395, 396) operative during detection of binary data corresponding to the known recorded data for moving a selected one of the decision boundaries upward $m_1$ units and then downward $m_2$ units from an initial preselected value;

two separate counters ($M_A$, $M_B$) operative while the selected boundary is moved (a) upward and then (b) downward for counting number of times (a) a specific sequence of the detected binary data that should be above the selected boundary is detected as a data sequence below said selected boundary and (b) number of times a sequence of the detected binary data that should be below said selected boundary is detected as a data sequence above said selected boundary, respectively;

a margin balance counter (C) for accumulating a count having a magnitude and sign denoting difference between counts in said separate counters; and circuitry (376) responsive to a predesignated control event for adjusting the selected decision boundary upwardly if the count in the margin balance counter at least equals a preselected number $+S_1$ or downwardly if the last-mentioned count is not greater than a preselected number $-S_2$.

* * * * *

UNITED STATES PATENT AND TRADEMARK OFFICE
CERTIFICATE OF CORRECTION

PATENT NO. : 5,491,698
DATED : February 13, 1996
INVENTOR(S) : Patel, Rutledge, and So It is certified that error appears in the above-indentified patent and that said Letters Patent is hereby corrected as shown below:

Column 7, line 36, delete "Table 5" and add --Table 4--

Column 9, line 28, "fin this case," should read --in this case--.

Column 19, line 12, remove "$S_2 < N_3$" and add --$S_2 < N_2$--

Signed and Sealed this

Thirtieth Day of July, 1996

Attest:

BRUCE LEHMAN

*Attesting Officer*    *Commissioner of Patents and Trademarks*